US007777151B2

(12) United States Patent
Kuo

(10) Patent No.: US 7,777,151 B2
(45) Date of Patent: Aug. 17, 2010

(54) PORTABLE PLASMA STERILIZER

(75) Inventor: Spencer P Kuo, River Edge, NJ (US)

(73) Assignee: Adventix Technologies Inc., River Edge, NJ (US)

( * ) Notice: Subject to any disclaimer, the term of this patent is extended or adjusted under 35 U.S.C. 154(b) by 277 days.

(21) Appl. No.: 12/030,982

(22) Filed: Feb. 14, 2008

(65) Prior Publication Data

US 2009/0206062 A1 Aug. 20, 2009

(51) Int. Cl.
*B23K 10/00* (2006.01)

(52) U.S. Cl. ........................... 219/121.47; 219/121.48; 219/121.52; 219/75

(58) Field of Classification Search ............ 219/121.47, 219/121.52, 121.51, 121.48, 76.16
See application file for complete search history.

(56) References Cited

U.S. PATENT DOCUMENTS 3,689,740 A * 9/1972 De Corso et al. ............ 219/383
4,911,814 A * 3/1990 Matsuoka et al. ...... 204/298.17
5,220,150 A * 6/1993 Pfender et al. ......... 219/121.51
5,538,765 A * 7/1996 Kurihara et al. ............. 427/577
6,329,628 B1 * 12/2001 Kuo et al. .............. 219/121.54
7,091,441 B1 * 8/2006 Kuo ...................... 219/121.36

* cited by examiner

*Primary Examiner*—Mark H Paschall

(57) ABSTRACT

A handheld air plasma spray is designed. Plasma is generated by a magnetized arc torch running at 60 Hz and is in non-equilibrium state; thus, the plasma effluent has relatively low temperature (touchable) and yet contains high energy electrons (>5 eV) capable to dissociate oxygen molecules to atomic oxygen. The emission spectroscopy of the torch indicates that the plasma effluent carries an abundance of atomic oxygen, which can effectively kill all kind microbes. Moreover, the experimental results show that this plasma can rapidly clot blood. This invention is for sterilization and blood coagulation applications.

4 Claims, 5 Drawing Sheets

PORTABLE PLASMA STERILIZER

§1. BACKGROUND OF THE INVENTION

§1.1 Field of the Invention

The present invention generally concerns the design of a handheld air plasma spray for sterilization and blood coagulation applications.

§1.2 Background

A torch module described in the article S. P. Kuo, et al., "Design and electrical characteristics of a modular plasma torch," IEEE Trans. Plasma Sci., Vol. 27, no. 3, pp. 752-758, 1999; and U.S. Pat. No. 6,329,628 titled "Methods and Apparatus for Generating a Plasma Torch," ("the '628 patent") can be run in low frequency (e.g., 60 Hz) periodic mode to produce low temperature non-equilibrium air plasma. Based on the principle of this torch module, a portable torch device is devised for applications requiring plasma to be exposed directly to the open air. One of the applications is for sterilizing contaminated objects and the other one is for coagulating blood.

The advantage of producing non-equilibrium plasma is to have a better usage of the electron plasma energy, gained from the discharge, for the production of reactive oxygen species (ROS), rather than for heating the torch. ROS (particularly, the reactive atomic oxygen (RAO)) are effective to kill microorganisms including the toughest biological agents, bacterial spores, such as Anthrax (See, e.g., the articles: H. W. Herrmann et al., "Decontamination of chemical and biological warfare (CBW) agents using an atmospheric pressure plasma jet (APPJ)," Phys. Plasma, Vol. 6, pp. 2284-2289, 1999 (hereafter referred to as "the Herrmann article"); and Wilson Lai et al., "Decontamination of Biological Warfare Agents by a Microwave Plasma Torch", Phys. Plasmas, Vol. 12, 023501 (1-6), February 2005 (hereafter referred to as "the Lai article")). The mechanism of killing spores by ROS was explored by scanning electron microscope (SEM) and by atomic force microscope (AFM). The results show that ROS cause changes in spores' morphological structures and shape and thus lead to the destruction of the spores (See, e.g., the article: Olga Tarasenko et al., "Scanning Electron and Atomic Force Microscopy to Study Plasma Torch Effects on *B. cereus* Spores", IEEE Trans. Plasma Sci., Vol. 34, No. 4, pp. 1281-1289, August 2006 (hereafter referred to as "the Tarasenko article")).

§2. SUMMARY OF THE INVENTION

A handheld air plasma torch is devised. A photo of the device including the power supply is shown in FIG. 1. This torch produces abundant RAO in the plasma effluent, which can effectively kill all kind microbes. The plasma torch produced by this device as shown in the insert of FIG. 1 has a cylindrical shape with a radius of about 1 cm or more and a height of about 3 cm. A schematic of the torch design is presented in FIG. 2.

ROS are inferred by the emission spectroscopy of the plasma effluent. The emission profile at 777.4 nm shown in FIG. 3 is a clear evidence of atomic oxygen generated by the torch. The produced RAO reaches out more than 20 mm. This device using only airflow can easily and quickly generate a plasma torch.

This portable handheld torch has been tested for the blood coagulation application. This is illustrated in FIG. 4. Samples used in the tests were made from anticoagulated blood, i.e., all blood samples were add 3.2% sodium as well as anticoagulated medication with a ratio of 1:9 which prevented blood coagulation by itself. As shown, a shell is formed on the surface of an anticoagulated blood sample exposed to the torch for 16 seconds. Moreover, fibrin (i.e., protein helping blood to clot) is found on the shell; a clear evidence of blood coagulation.

The present invention uses a power supply having a circuitry shown in FIG. 5 that is simple and is adaptable to a number of AC power sources, such as 60 Hz (or 50 Hz) voltage available at most common wall outlets.

§3. BRIEF DESCRIPTION OF THE DRAWINGS

FIG. 1 is a photo of the complete system of the invention including a handheld torch and its power supply. The dimensions of the components are labeled. The insert is a photo of a running torch.

§4. DETAILED DESCRIPTION

The present invention involves a novel design of a magnetized arc torch, which is handheld, uses only airflow, and produces RAO in the plasma effluent. The following description is presented to enable one skilled in the art to make and use the invention, and is provided in the context of a particular application and its requirement. Various modifications to the disclosed embodiments will be apparent to those skilled in the art, and the general principles set forth below may be applied to other embodiments and applications. Thus, the present invention is not intended to be limited to the embodiments shown.

In the following, functions, which may be performed by the present invention, are introduced in §4.1. Then, structures of the apparatus built in accordance with the present invention are described in §4.2. Several applications of the invention are described in §4.3. Thereafter, operations of the apparatus are described in §4.4. Finally, conclusions about the present invention are presented in §4.5.

§4.1 Functions

The present invention may be used to generate a plasma torch having a relatively large size (e.g., at least 2 cm height and at least 2 cm diameter) in open region and a relatively high density (e.g., at least $10^{13}$ electrons/$cm^3$), as well as to produce RAO in the plasma effluent. The torch is low temperature and touchable; the present invention does not rely on the heat produced by the torch for the sterilization and blood coagulation purposes. In other words, it is safe to have a close contact of this torch with the objects (e.g., skin, clothes, and paper).

§4.2 Structures

In the following, a handheld torch device is described.

Figure 1:
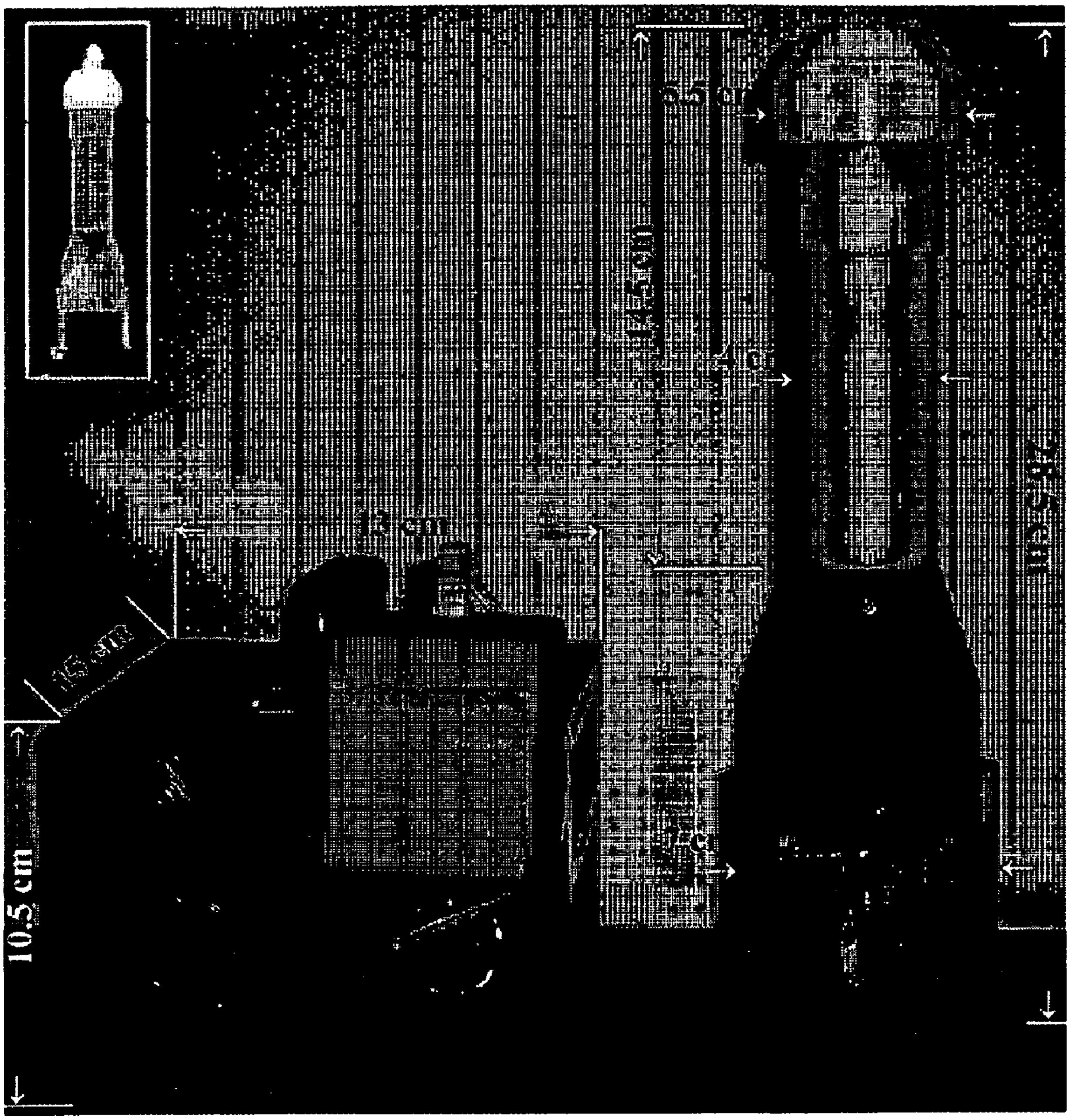
Figure 2:
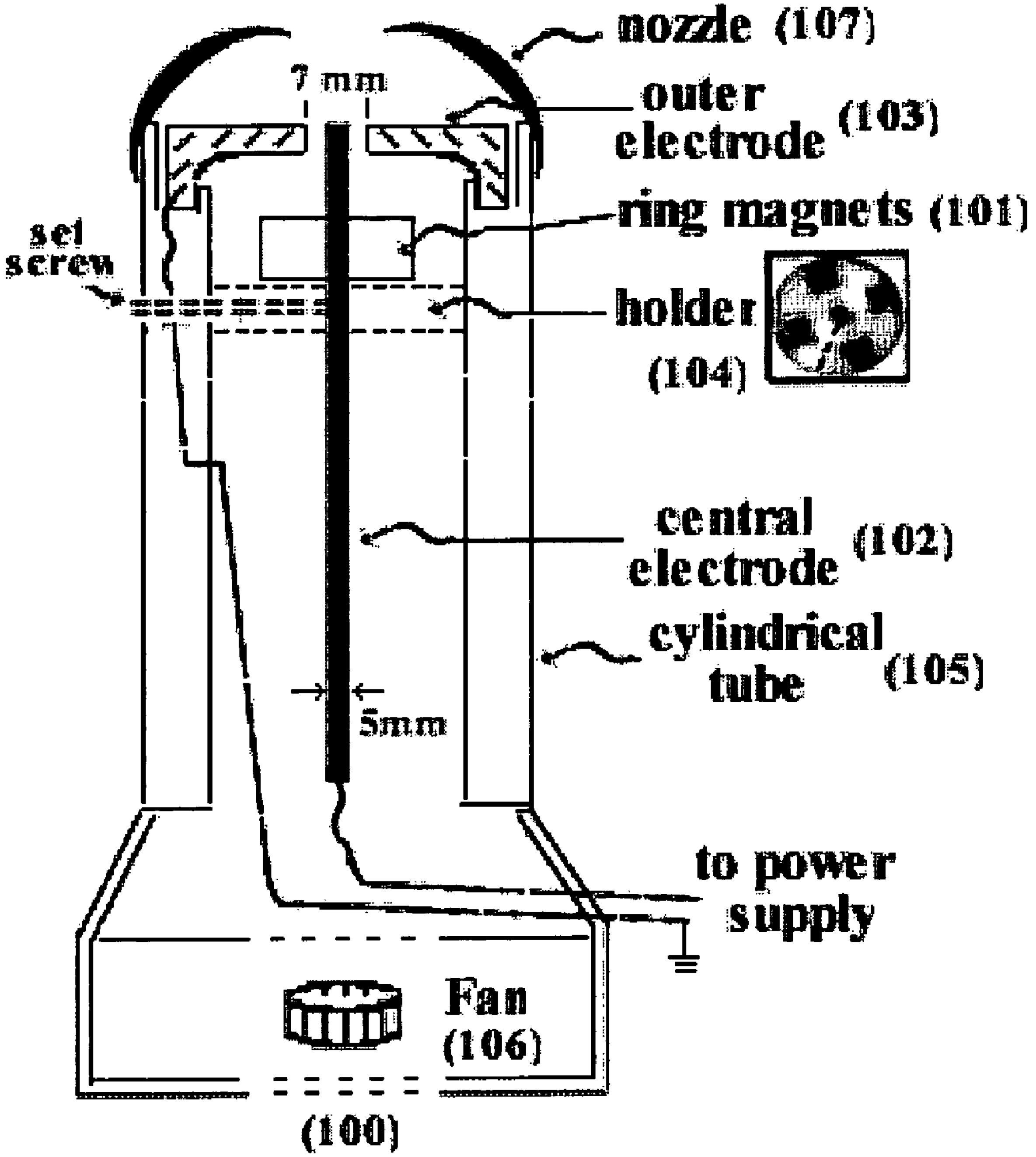
FIG. 2 is a schematic of the torch device.

This torch, as shown by the schematic (100) in FIG. 2, consists of a pair of concentric electrodes, a set of ring magnets, and a fan. To stabilize the discharge and to avoid the possibility of forming hot spot in the arc discharge three ring-shaped permanent magnets (12(od)×5.3(id)×2 mm each) (101) are inserted through the central electrode (a cylindrical copper rod with a diameter of 5 mm) (102) and held inside the outer electrode (103) of the torch as illustrated in FIG. 2. This arrangement is different from the other design that uses a much larger ring-shaped permanent magnet positioned concentrically outside the outer electrode. The permanent magnets work to rotate the discharge current so that the undesirable arc constriction can be minimized and the erosion of the electrodes by the discharges is reduced.

A position holder (104) has a height of 10 mm and is tie fit with the central electrode (102). It keeps the central electrode (102) along the central axis of the cylindrical tube (105). This holder as shown in the insert of FIG. 2 has large opening for the airflow generated by a centrifugal fan (106) to pass through. This centrifugal fan (106) is connected at the bottom of the cylindrical tube (105), which serves as the airflow channel. The airflow passes through the four openings of the holder to the gap between the electrodes.

A nozzle (107) is introduced to direct the flow of the plasma effluent as well as to cover the electrodes for the safety purpose so that the high voltage (HV) central electrode is not exposed. The dimension and shape of the cylindrical tube (105), hosting the electrodes and providing an airflow channel, are variable.

§4.3 Applications of the Device

§4.3.1 Sterilization

A device made in accordance with the present invention, such as that described in §4.2, may be used as a plasma spray carrying reactive species such as atomic oxygen. Such a plasma spray may be used to kill microbes on clothes, handles, as well as to decontaminate instruments and filters.

Figure 3:
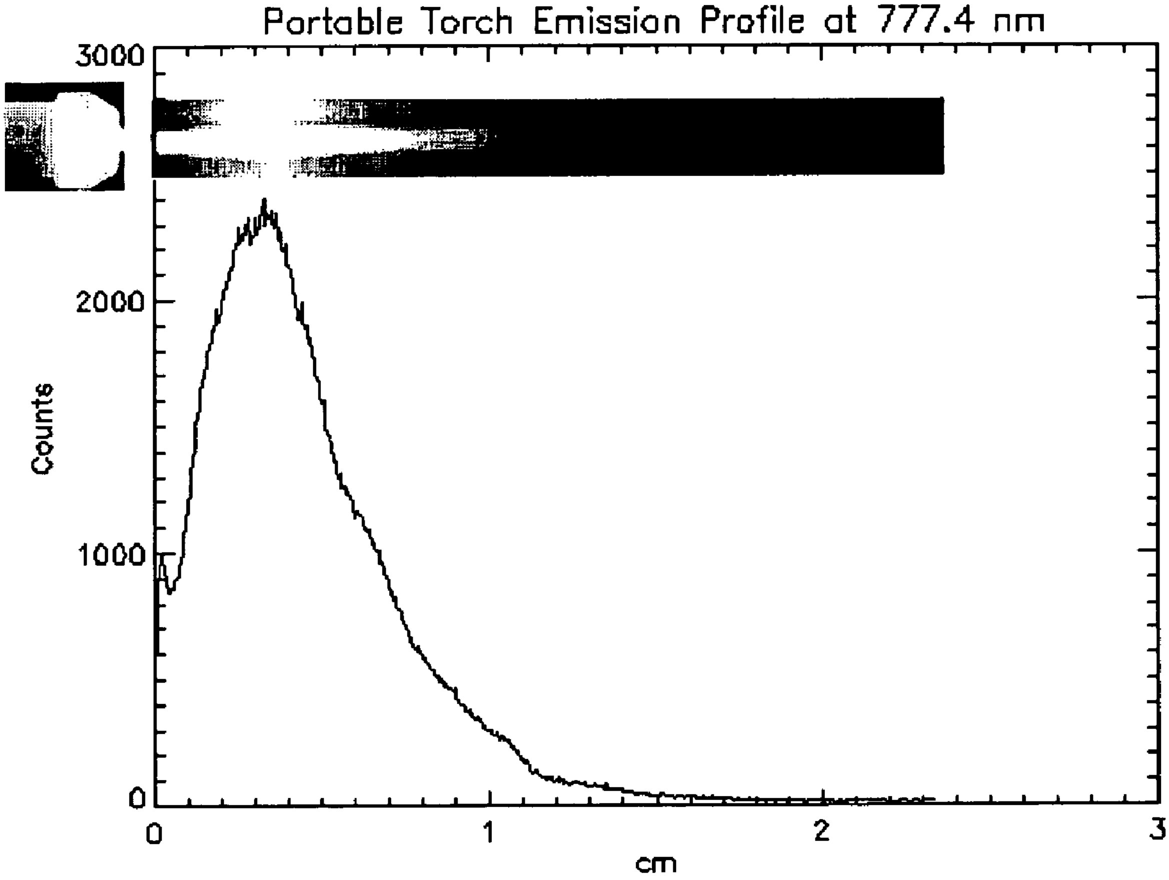
FIG. 3 is the spatial distribution of the emission intensity at 777.4 nm.

The emission spectroscopy of the plasma torch generated by the embodiment of the present invention described in §4.2 was analyzed to deduce the information on the intensity and spatial distribution of atomic oxygen generated by the plasma torch. The oxygen triplet spectrum around 777.4 nm, shown in FIG. 3, verifies the generation atomic oxygen, which is the most reactive oxygen species and can destroy just about all kinds of organic contaminants by means of chemical reactions causing irreversible protein degradation and eventually, converting contaminants into carbon dioxide and water.

The device of the present invention is portable, fast working, and operates stably with air discharge (i.e., no mass storage requirement in its operation). This device is based on non-thermal and dry approach for sterilization and decontamination; the process is "green" (i.e., no hazardous chemicals are released) as well as safe to personnel (short lifetime of RAO) and sensitive equipment. These are the advantageous features for sterilization and decontamination applications.

§4.3.2 Blood Coagulation

Figure 4:
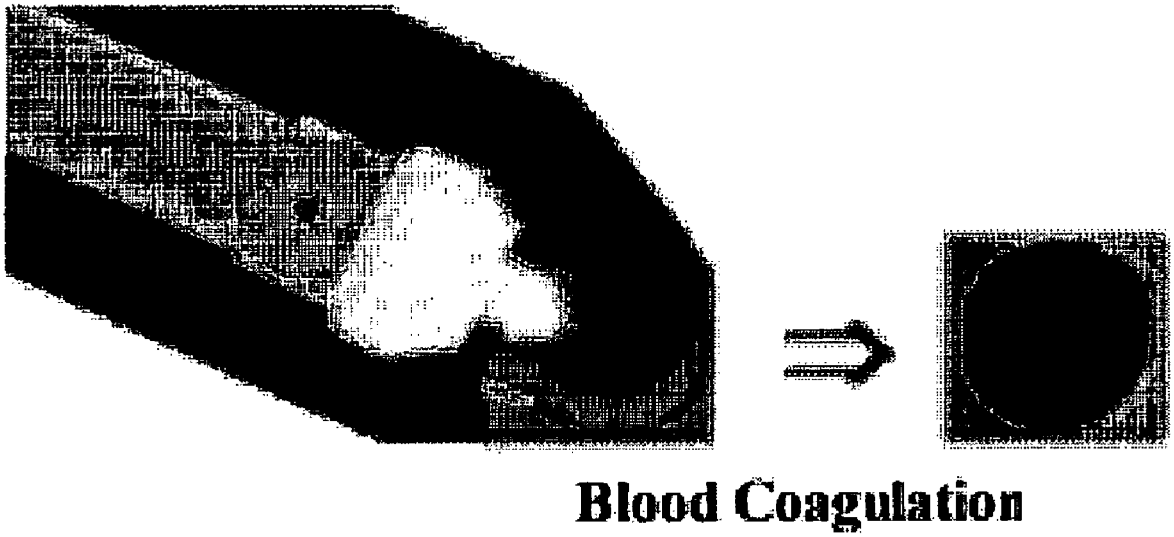
FIG. 4 is a demo of applying the torch for blood coagulation application.

As verified experimentally and demonstrated in FIG. 4, this torch can rapidly clot blood. Thus, this device can be adopted for the emergency situation. The torch also sterilizes the wound simultaneously. This dry approach is particularly suitable for wounds, for example, caused by burning.

§4.4 Operations of an Exemplary Embodiment

Figure 5:
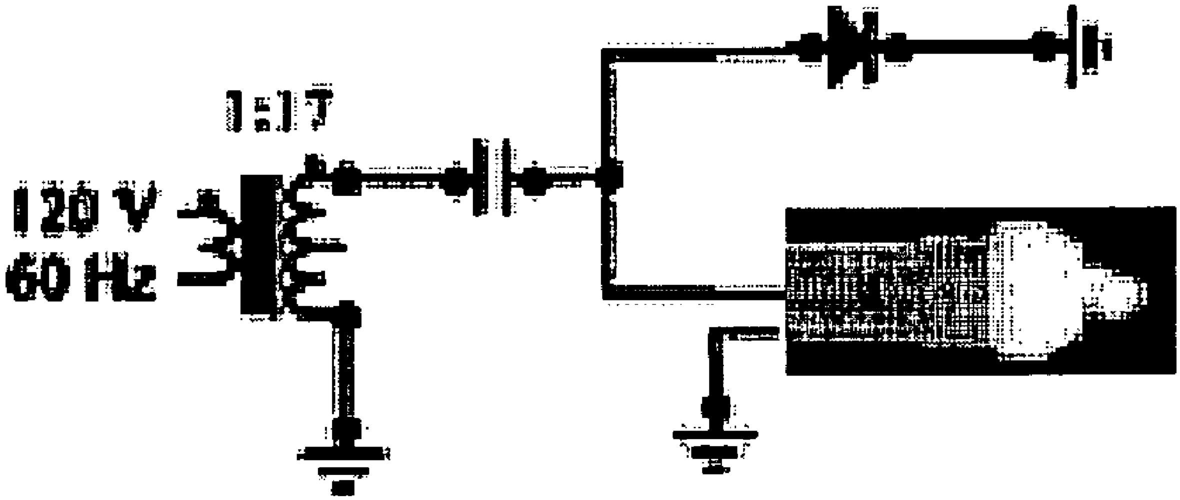
FIG. 5 is the circuitry of the power supply.

An exemplary arc plasma torch such as that described in §4.2 above, may be run at a 60 Hz periodic mode. The breakdown voltage of the arc discharge is about 3 kV and the peak arc current is less than 5 A. A power supply with the circuitry shown in FIG. 5 may be used to run the torch.

§4.5 Conclusions

The invention is handheld and operates with airflow only. The plasma effluent produced by the invention can rapidly kill microbes and clot blood and is low temperature safe to personnel. This is a practical device used, for instance, in emergency vehicles and hospitals, as well as in industry and household.

Such a handheld plasma sterilization device may be constructed from available commercial parts together with custom designed components described in §4.2.

What is claimed is:

1. A handheld portable air plasma spray torch apparatus using ambient air as the working gas, said torch comprising:

a copper cylindrical rod-shaped inner electrode and a copper ring-shaped outer electrode aligned axially to make a uniform discharge gap for plasma discharge between a downstream discharge end of the electrodes;

a set of ring-shaped permanent magnets placed concentric with and around the inner electrode, permitting an airflow to flow between the electrode downstream ends;

a position holder positioned upstream of the electrode ends, the ring-shaped magnets positioned between said electrode ends and the position holder, with said magnets seated by and in contact with the position holder, said inner electrode passing through a center of the ring-shaped magnets, said holder and magnets positioned to allow air flow to the downstream ends of the electrodes to the discharge gap;

a tube frame housing, said electrodes, position holder and ring-shaped magnets contained within said housing having an inlet end and an outlet end;

a centrifugal fan positioned at the inlet end of the tube frame housing, said fan creating an airflow through the housing to the electrode discharge gap to create a plasma discharge and plasma flow at the discharge gap;

a cap attached to the outlet end of the tube frame housing, said cap positioned downstream of the discharge ends of the electrodes for protecting the discharge ends of the electrodes;

a power supply connected to the inner and outer electrodes to form a plasma discharge at the discharge ends of said electrodes.

2. The apparatus of claim 1 wherein the number of permanent magnets in the ring-shaped set of magnets is variable, said magnets functioning to reduce the temperature of the air plasma torch by rotating the plasma flow created.

3. The apparatus of claim 1 wherein the plasma flow generated contains reactive atomic oxygen in the plasma effluent at the discharge end of the plasma torch.

4. The apparatus of claim 1 wherein the plasma discharge created extends 20 mm or more from the torch nozzle.

* * * * *